United States Patent [19]

Sagen

[11] Patent Number: 5,320,576

[45] Date of Patent: Jun. 14, 1994

[54] DEER PELVIS BONE SAW

[76] Inventor: Garland L. Sagen, 310 9th Ave. South, Devils Lake, N. Dak. 58301

[21] Appl. No.: 935,243

[22] Filed: Aug. 27, 1992

[51] Int. Cl.$^5$ .............................................. A22B 5/20
[52] U.S. Cl. .................................. 452/164; 30/166.3; 30/511
[58] Field of Search ........................ 452/149, 160, 164; 30/166.3, 92, 121, 371, 374, 377, 505, 517; 606/82

[56] References Cited

U.S. PATENT DOCUMENTS 1,088,719  3/1914  Peterson ........................... 30/166.3
1,695,231  12/1988  Eagan .................................. 30/511
2,698,621  1/1955  Fernandez ........................... 606/82

FOREIGN PATENT DOCUMENTS 373074  4/1923  Fed. Rep. of Germany ..... 30/166.3
817668  7/1949  Fed. Rep. of Germany ..... 30/166.3

Primary Examiner—Willis Little
Attorney, Agent, or Firm—Zarley, McKee, Thomte, Voorhees & Sease

[57] ABSTRACT

A one-person-powered handsaw constructed precisely to sever the pelvis bone of a deer species while providing protection against puncturing the large intestine when field-dressing the animal.

1 Claim, 1 Drawing Sheet

DEER PELVIS BONE SAW

CROSS REFERENCE TO RELATED APPLICATIONS

A thorough patent search revealed only one similar use product, yet a completely different tool.

(a) Related use U.S. Pat. No. 3,583,024 Deer pelvis bone shearing knife.

BRIEF SUMMARY OF THE INVENTION

The present invention offers the deer hunter a small, portable, one-man, hand-operated tool which may be carried in the field either in a pocket, pouch, or sheath.

This tool provides the deer hunter a means to quickly, conveniently, and safely sever the pelvis bone while field-dressing a downed deer.

A unique feature of the DEER PELVIS BONE SAW is a stopper that prevents the saw from exiting the bone on each pull stroke.

A second unique feature is a rounded nose on the far end which pushes the underlying large intestine away from the cutting teeth on each downward stroke, therefore minimizing the possibility of puncturing the large intestine.

BACKGROUND OF THE INVENTION

The present invention relates to the need of a deer hunter during field-dressing of deer species. All deer hunters and consumers of wild game recognize the need to field-dress their deer as soon as possible after a kill in order to maintain the carcass in an edible condition. This process is normally accomplished using a skinning knife, which is satisfactory during field-dressing until the hunter reaches the pelvis bone which must then be severed. Heretofore, this severing of the pelvis bone has been completed in a haphazard fashion by placing a knife blade—either the long cutting edge or the point of the blade—on the seam where the pelvis bones are joined together and are softer than the true bone and using a heavy object, such as a hammer, hatchet, or rock, to pound on the knife until the bone is severed, which, in some cases, requires several forceful blows. This practice is not only damaging to the knife, but as the sharp knife severs the pelvis bone, it may also sever the large intestine just below and inside the circular pelvis bone, causing feces and feces juices to flow out and over the meat to be consumed which then makes the meat unfit for human consumption. This practice is objectionable to the experienced hunter; but it is the only practice used today, as presently there is not available to the deer hunter an appropriate portable means to sever the deer pelvis bone while protecting the underlying large intestine.

BRIEF DESCRIPTION OF THE FIGURE DRAWINGS

A detailed description of one preferred embodiment of the DEER PELVIS BONE SAW is hereafter described with specific reference being made to the drawings in which.

DESCRIPTION OF THE PREFERRED EMBODIMENT

Detailed Description of Drawings

Figure 1:
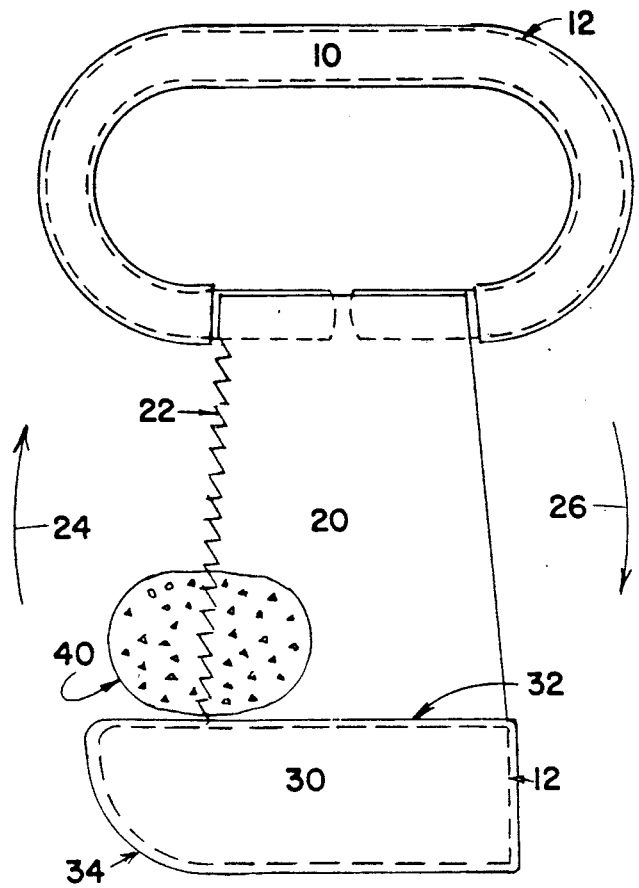
FIG. 1 is an actual-size side elevation of the DEER PELVIS BONE SAW constructed in accordance with the present invention, including an average size deer pelvis bone.

FIG. 1 is showing the DEER PELVIS BONE SAW comprising the invention which includes a handle 10 acting as a means to control the blade 20 with saw teeth 22 cutting a deer pelvis bone 40, a stroke stopper 30 which also comprises a bumper 34 which performs the duty of urging the deer's large intestine away from the sharp saw teeth 22. These elements are of the material now commonly employed in the manufacture of a carpenter's wood handsaw comprising a good grade of steel.

The saw blade 20 is a pull-type saw, meaning that it is designed to cut as the teeth 22 are being pulled by the handle 10 while on and through the bone 40 toward the operator. The sawing action involves the gripping of the handle 10 while reciprocally drawing the saw in the cutting direction 24 with the cutting edge 22 of the blade 20 engaging the bone 40, thus cutting the bone until the stopper 32 comes in contact with the bone. The handle is then urged forward or away from the operator in an arc, indicated by 26, to simply return the saw to the next cutting stroke position. This return is at very light pressure to the bone with little or no cutting taking place.

The cutting teeth 22 configuration, design, angle, etc., are of no significance to this invention except to note they are of similar design, angle, set, and sharpness to any store-purchased, cross-cut carpenter's handsaw with approximately eight to ten teeth per inch that would be used to cut an ordinary pine wood board.

The handle 10 is comprised of plastic-like material.

The stopper/bumper 30 is comprised of plastic-like material.

Figure 2:
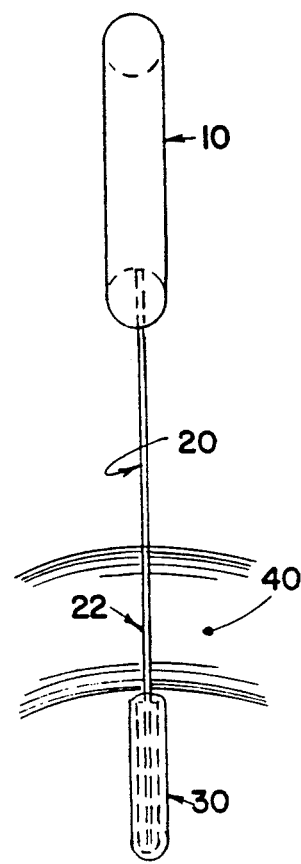
FIG. 2 is an actual-size back view of the DEER PELVIS BONE SAW constructed in accordance with the present invention, including an average size deer pelvis bone.

FIG. 2 is a back view of the blade 20 with the handle 10 at the top and the stopper/bumper 30 at the bottom position on the deer pelvis bone ready for the next cut.

Figure 3:
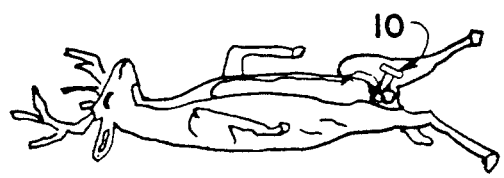
FIG. 3 is a view of a downed deer being field-dressed with the DEER PELVIS BONE SAW positioned to sever the pelvis bone.

FIG. 3 is a view of a partially dressed deer carcass with the DEER PELVIS BONE SAW positioned for severing the pelvis bone.

Figure 4:
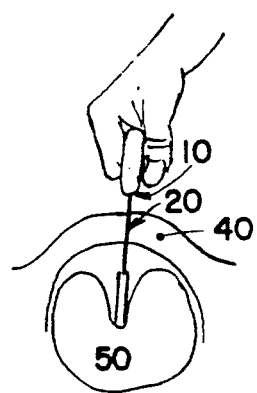
FIG. 4 is a view of the DEER PELVIS BONE SAW severing the pelvis bone while the far blunt, padded end pushes the large intestine out of harm's way of the cutting saw teeth.

FIG. 4 is a view from the upper body cavity of the deer, illustrating the position of the DEER PELVIS BONE SAW with the bumper 34 pressing the large intestine 50 away from the saw teeth 22 as the operator exerts power or pressure on the handle 10 to impart a reciprocal motion on the blade 20 and saw teeth 22 as it cuts through the pelvis bone 40 after several strokes.

While preferred specific embodiments of the invention are presently stated above, it is to be clearly understood that the invention is not to be limited to the exact constructions and designs illustrated and described because modifications of these details may be provided in putting the invention into practice.

What is claimed is:

1. A hand-powered saw apparatus, movable in a power cutting stroke and a return stroke, for severing the pelvis bone of a deer or large game animal while protecting the underlying intestine, comprising:

a substantially flat handle having an upper end and a lower end, an elongated flat saw blade secured at one end to said handle between the upper and lower ends thereof and extending therefrom, said saw blade having upper and lower edges, said lower edge of said saw blade having saw teeth of the pull type provided thereon whereby said saw teeth will cut the pelvis bone, during the power stroke, as the handle and saw blade are moved towards the person operating the saw apparatus, and will not cut the pelvis bone during return stroke, and a stopper-bumper positioned on the other end of said saw blade, said stopper-bumper having a lower end portion which protrudes below the saw teeth on the lower end of said saw blade, said stopper-bumper having a thickness substantially greater than the thickness of said saw blade whereby said stopper-bumper will not rupture the underlying intestine as said saw blade is moved towards the animal during its return stroke, said protruding portion at the lower end of said bumper-stopper protruding a distance away from said saw blade sufficient to stop said saw blade from exiting the pelvis bone during the power stroke.

* * * * *